(12) United States Patent
Aoki et al.

(10) Patent No.: US 7,980,773 B2
(45) Date of Patent: Jul. 19, 2011

(54) CAMERA MODULE AND IMAGING APPARATUS

(75) Inventors: Susumu Aoki, Ibaraki (JP); Ikuo Shinta, Ibaraki (JP)

(73) Assignee: Hitachi Maxell, Ltd., Ibaraki-shi (JP)

( * ) Notice: Subject to any disclaimer, the term of this patent is extended or adjusted under 35 U.S.C. 154(b) by 60 days.

(21) Appl. No.: 11/984,979

(22) Filed: Nov. 26, 2007

(65) Prior Publication Data

US 2008/0131112 A1 Jun. 5, 2008

(30) Foreign Application Priority Data

Nov. 30, 2006 (JP) .................................. 2006-324096
Dec. 1, 2006 (JP) .................................. 2006-326059

(51) Int. Cl.
*G03B 17/00* (2006.01)
*G02B 17/02* (2006.01)

(52) U.S. Cl. ........................................ 396/529; 359/819

(58) Field of Classification Search .................. 396/429, 396/529, 535; 348/340, 373–376; 359/819; 250/239
See application file for complete search history.

(56) References Cited

U.S. PATENT DOCUMENTS

| | | | |
|---|---|---|---|
| 2001/0050717 A1* | 12/2001 | Yamada et al. | 348/340 |
| 2005/0237415 A1* | 10/2005 | Kong et al. | 348/335 |
| 2005/0242410 A1* | 11/2005 | Groot et al. | 257/433 |
| 2005/0285016 A1* | 12/2005 | Kong et al. | 250/208.1 |
| 2006/0227236 A1* | 10/2006 | Pak | 348/340 |
| 2007/0047109 A1* | 3/2007 | Shibata et al. | 359/819 |

FOREIGN PATENT DOCUMENTS

| | | |
|---|---|---|
| JP | A-2003-051973 | 2/2003 |
| JP | A-2004-221874 | 8/2004 |
| JP | A-2006-80961 | 3/2006 |
| JP | 2006157475 A * | 6/2006 |

OTHER PUBLICATIONS

JP-2006157475 A Machine Translation available on JPO website.*
Japanese Patent Office, Japanese Office Action for Japanese Patent Application No. 2006-324096 (with partial English translation), Apr. 15, 2011, pp. 1-2.

* cited by examiner

*Primary Examiner* — W. B. Perkey
*Assistant Examiner* — Minh Q Phan
(74) *Attorney, Agent, or Firm* — Oliff & Berridge, PLC

(57) ABSTRACT

A camera module includes a sensor for converting incident light incident thereto into an electric signal and outputting the electric signal therefrom, a glass cover for transmitting therethrough light to the sensor, the light being the incident light; a flexible printed circuit for receiving as an input thereto the electric signal outputted from the sensor, a lens unit for focusing the incident light onto the sensor, and a pedestal for holding the lens unit, the pedestal including a sidewall section which includes a lower end surface being fixed onto the flexible printed circuit by use of adhesive. A depression is formed along the sidewall section of the mount to discard the adhesive therein.

11 Claims, 8 Drawing Sheets

CAMERA MODULE AND IMAGING APPARATUS

The present application claims priorities from Japanese applications JP2006-324096 filed on Nov. 30, 2006, JP2006-326059 filed on Dec. 1, 2006, the contents of which are hereby incorporated by reference into this application.

BACKGROUND OF THE INVENTION

The present invention relates to a camera module and an imaging apparatus which are to be mounted, for example, on a cellular phone, and in particular, to a camera module and the like suitable to be downsized.

Recently, a camera system is also mounted on a cellular phone and the like. In such camera system, there is broadly used a camera module in which an image of an object is focused onto an image sensor by use of a microlens.

As the cellular phone is reduced in size, it is further required to downsize the camera module.

As a technique associated with a camera module which is downsized and which has high focusing precision, there has been known a conventional technique corresponding to JP-A-2003-51973.

The technique described in JP-A-2003-51973 employs a configuration including a lens, a body tube to support the lens, an image sensor chip which produces by its sensor unit an image by using light incident via the lens thereto and which resultantly outputs an image signal, and a printed circuit board including a window section. The body tube is fixed onto a surface of the printed circuit board. The image sensor chip is fixed onto a surface of the printed circuit board opposing to the surface on which the body tube is fixed such that the sensor unit is placed in the window section of the printed circuit board.

To make the camera module smaller, it is effective that the body tube to support the lens and a pedestal mount to house the imaging element thereon are configured in one package to thereby minimize the space not efficiently used. When adhesive is employed to fixedly install the constituent parts, each gap secured between the parts is reduced to the maximum extent for the downsizing of the camera module. In the conventional camera module, an excessive portion of the adhesive enters such gap. However, since the gap is reduced due to the downsizing of the camera module, the excessive portion of the adhesive is an important problem to be solved.

SUMMARY OF THE INVENTION

It is therefore an object of the present invention to provide a camera module or the like in which it is prevented that the excessive portion of the adhesive enters an imaging area when producing, for example, a camera module to thereby lowering the number of defectives in the production. Another object the present invention is to provide a camera module or the like capable of aligning the imaging element with the lens in the longitudinal and vertical directions with high precision.

To achieve the objects in accordance with the present invention, there is provided a camera module including an imaging element for converting incident light incident thereto into an electric signal and outputting the electric signal therefrom, a cover member for transmitting therethrough light to the imaging element, the light being the incident light; a printed circuit for holding the imaging element and the cover member and receiving as an input thereto the electric signal outputted from the imaging element, a lens for focusing the incident light onto the imaging element, and a pedestal mount for holding the lens, the pedestal mount including a sidewall section which includes a lower end surface being fixed onto the printed circuit by use of adhesive. The sidewall section includes a discard module to discard the adhesive.

In the camera module, the discard module is a depression formed, along the sidewall section, on a surface opposing to the cover member in the pedestal mount.

The camera module further includes a chamber in a corner area of the depression, the corner area having a larger groove width than areas other than the corner area.

In the camera module, the discard module is a notch formed on an inner side of the corner area of the sidewall section, the notch reducing an area of the lower end surface of the sidewall section.

In the camera module, the discard module is a thin area in which a portion of the lower end surface of the sidewall section has a smaller thickness.

To achieve the objects according to the present invention, there is provided a camera module including an imaging element for converting incident light incident thereto into an electric signal and outputting the electric signal therefrom, a cover member for transmitting therethrough light to the imaging element, the light being the incident light; a printed circuit for holding the imaging element and the cover member and receiving as an input thereto the electric signal outputted from the imaging element, a lens for focusing the incident light onto the imaging element, and a pedestal mount for holding the lens, the pedestal mount including a sidewall section being attached onto the printed circuit. The sidewall section includes an inner surface on which projections are formed, the projections being brought into contact with side end surfaces of the cover member and thereby determining a position of the cover member.

The camera module further including a middle ring for interrupting light in an infrared wavelength zone and for limiting an amount of light transmitting therethrough and a plurality of the lenses. The middle ring is held between the plural lenses.

To achieve the objects, there is provided a camera module including an imaging element for converting incident light incident thereto into an electric signal and outputting the electric signal therefrom, a cover member for transmitting therethrough light to the imaging element, the light being the incident light; a printed circuit for holding the imaging element and the cover member and receiving as an input thereto the electric signal outputted from the imaging element, a lens for focusing the incident light onto the imaging element, and a pedestal mount for holding the lens, the pedestal mount including a lower end surface being attached onto the printed circuit, wherein a depression is formed, along the sidewall section, in the pedestal mount.

The camera module further includes a curved surface in a corner area of the depression, the corner area having a larger groove width than areas other than the corner area.

In the camera module, a notch is formed on an inner side of the corner area of the sidewall section of the pedestal mount, the notch reducing an area of the lower end surface of the sidewall section.

In the camera module, bosses are formed in the pedestal mount, the bosses being brought into touch with the cover member and being apart from the depression.

To achieve the objects according to the present invention, there is provided a camera module including an imaging element for converting incident light incident thereto into an electric signal and outputting the electric signal therefrom, a cover member for transmitting therethrough light to the imaging element, the light being the incident light; a printed circuit for holding the imaging element and the cover member and receiving as an input thereto the electric signal outputted from the imaging element, a lens for focusing the incident light onto the imaging element, and a pedestal mount for holding the lens, the pedestal mount including a sidewall section being attached onto the printed circuit, the pedestal mount including a depression formed along the sidewall section, the camera module including a signal processing module connected to the printed circuit for processing the electric signal outputted from the printed circuit.

According to the present invention, there is provided a camera module or the like in which it is prevented that the excessive portion of adhesive enters an imaging area when producing, for example, a camera module to thereby lower the number of defectives in the production. Moreover, there is provided a camera module or the like capable of aligning the imaging element with the lens in the longitudinal and vertical directions with high precision.

Other objects, features and advantages of the invention will become apparent from the following description of the embodiments of the invention taken in conjunction with the accompanying drawings.

DESCRIPTION OF THE EMBODIMENTS

Referring now to the accompanying drawings, description will be given in detail of an embodiment according to the present invention.

Figure 1:
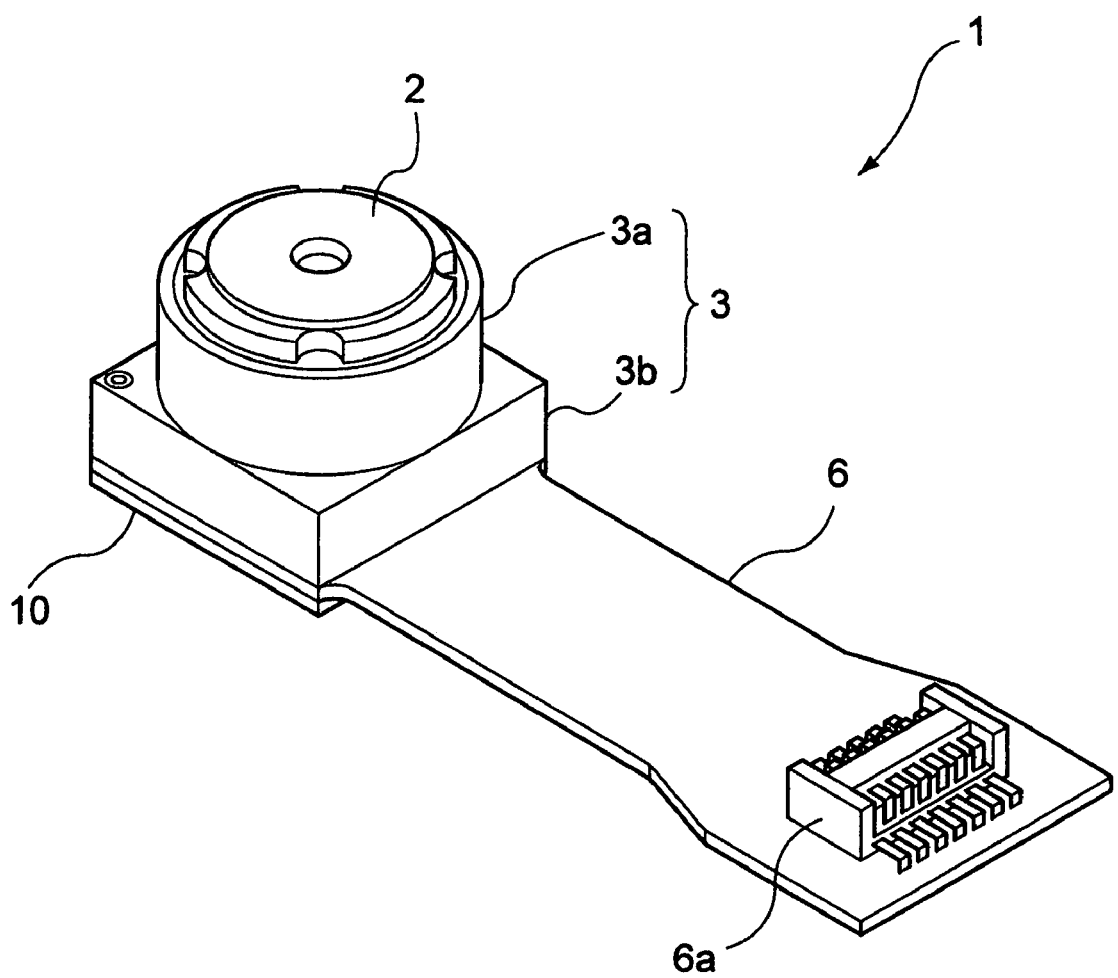
FIG. 1 is a perspective view showing an appearance of an embodiment of a camera module.
Figure 2:
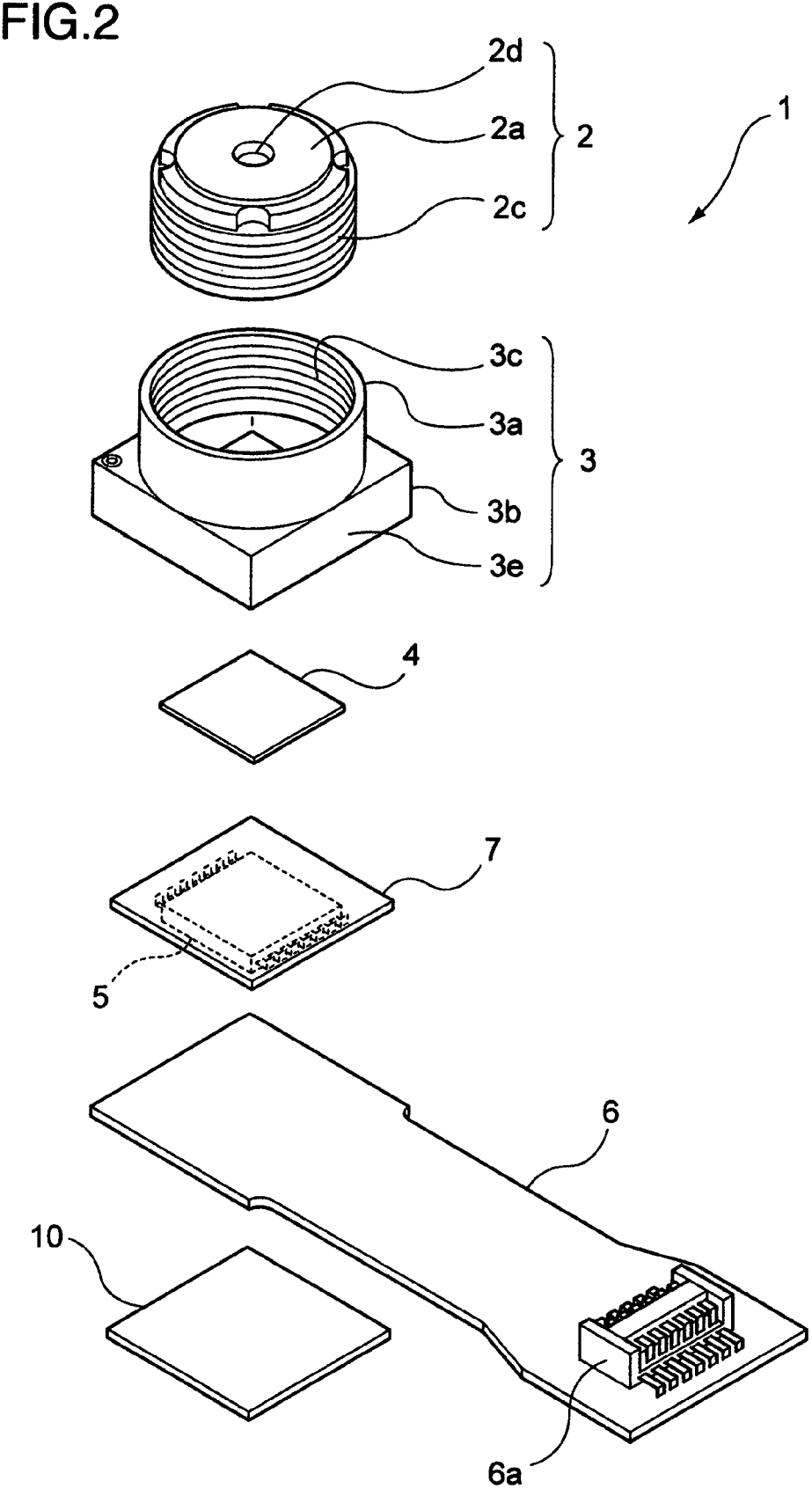
FIG. 2 is an exploded view of the camera module shown in FIG. 1.

FIG. 1 shows an appearance of a camera module 1 in an embodiment, and FIG. 2 shows an exploded view of the camera module 1.

As FIGS. 1 and 2 show, the camera module 1 includes a lens unit 2 which holds a plurality of lenses and which focuses incident light incident thereto onto a sensor 5, a sidewall section 3e to accommodate a filter 4 and the sensor 5, and a pedestal 3 to hold the lens unit 2. In the camera module 1, the filter 4 removes a particular-frequency component from light incident thereto and the sensor 5 converts light incident thereto into an electric signal. The camera module 1 also includes a square glass cover 7 arranged between the filter 4 and the sensor 5 and a Flexible Printed Circuit (FPC) 6 which is fixedly disposed on the pedestal 3 and which transfers an output signal from the sensor 5 to an external device. A reinforcing plate 10 is fixedly attached onto a rear surface of the flexible printed circuit 6 at a position thereof corresponding to the pedestal 3. In the camera module 1, a section of configured by attaching the lens unit 2 onto the pedestal 3 is called a body tube in some cases.

The pedestal 3 includes a cylindrical section 3a onto which the lens unit 2 is to be attached and a rectangular section 3b which accommodates and protects the filter 4 and the sensor 5, the cylindrical section 3a and the rectangular section 3b being configured in a unit. The pedestal 3 is constructed such that the internal space of the cylindrical section 3a are continuous to that of the rectangular section 3b. The pedestal 3 includes a flange 3d (reference is to be made to FIG. 3) which extends starting at an inner surface to narrow the inner space.

On an inner circumference of the cylindrical section 3a of the pedestal 3, a female screw 3c is formed. On an outer circumference of the lens unit 2, there is formed a male screw 2c corresponding to the female screw 3c. The lens unit 2 is screwed into the cylindrical section 3a, which will be described later. It is also possible that the lenses 2b and 2b' are directly attached onto the pedestal 3.

On an end surface of the rectangular section 3b of the pedestal 3 opposing the end surface associated with the cylindrical section 3a, a sidewall section 3e is formed. The bottom end surface of the sidewall section 3e of the cylindrical section 3a is fixed by adhesive 11 onto the flexible printed circuit 6. Specifically, the flexible printed circuit 6 is a flexible and inflectional circuit board effective to save space. In the printed circuit 6, a circuit is generally formed on a polyester (PET) film by printing, etching, or the like. On a first end of the printed circuit 6, the pedestal 3 is arranged, and on a second end of the circuit 6 opposing the first end thereof, a connector 6a is disposed. The connector 6a is linked with the sensor 5 by the printed circuit 6 and has a function to electrically connect to an external device, not shown.

Figure 3:
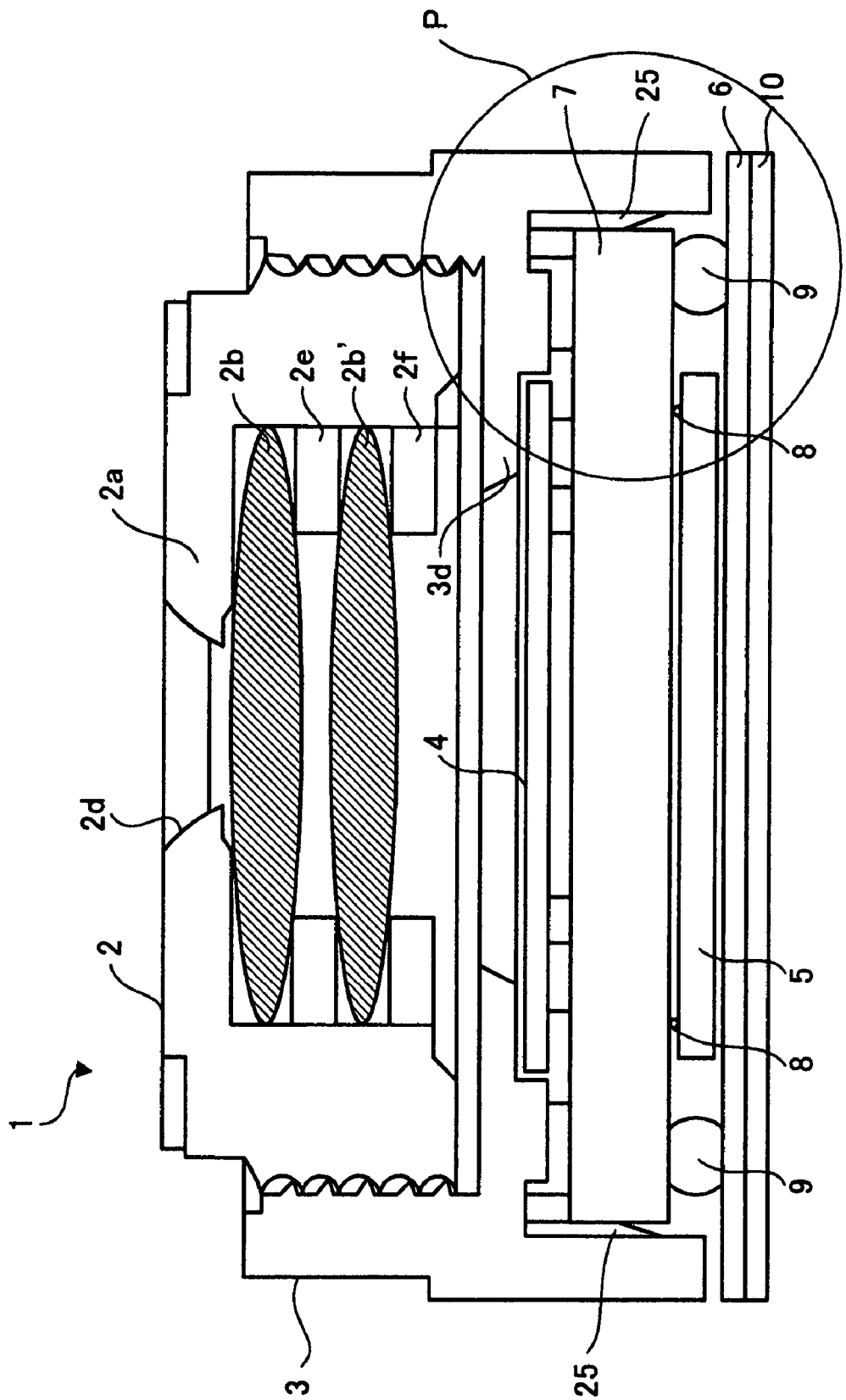
FIG. 3 is a cross-sectional view of the camera module shown in FIG. 1 taken along a longitudinal direction thereof.

FIG. 3 is a cross-sectional view of the embodiment of the camera module 1 taken along a longitudinal direction thereof.

As FIG. 3 shows, the lens unit 2 includes a barrel or holder 2a and lenses 2b and 2b' held by the barrel 2a. An opening 2d is formed in an end surface of the barrel 2a. The 2b and 2b' are optical elements to focus light incident thereto onto a light receiving area or an imaging area 5a of the sensor 5. That is, the lenses 2b and 2b' constitute a predetermined optical system which focuses light from the opening 2d to be incident to the sensor 5. In the embodiment, the optical system also includes a middle ring 2e between the lenses 2b and 2b'. The middle ring 2e has a diaphragm function to limit the amount of light passing therethrough. Two lenses 2b and 2b' are held by a lens holder 2f. The lens unit 2 is screwed into the cylindrical section 3a. After a focus adjustment is carried out using the screws, the lens unit 2 is fixedly installed on the pedestal 3 using adhesive 11 (reference is to be made to FIG. 4). This implements focus adjustment of the lens unit 2. Although the lens unit 2 includes two lenses 2b and 2b' in the embodiment, the lens unit 2 may include one lens or three lenses.

The barrel 2a is formed using a synthetic resin having a light interrupting function, for example, black polycarbonate or black polybutylene telephtalate. The lenses 2b and 2b' are formed using, for example, polycarbonate, an olefin-based material, a stiff resin such as a silicon-based resin, or glass.

The filter 4 is a member having a contour of a film to remove a particular frequency component from the light incident thereto. In the embodiment, an Infrared Cut Filter (IRCF) is employed as the filter 4. The filter 4 is attached onto the flange 3d using adhesive, not shown. By attaching the filter 4 onto the flange 3d, the internal space of the pedestal 3 is subdivided into two partitions. The filter 4 is disposed in the proximity of the sensor 5 and hence suppresses influence of diffused reflection of light.

The sensor 5 is an image sensor including, for example, a Charge Coupled Device (CCD) or a Complementary Metal Oxide Semiconductor (CMOS). In the embodiment, a sensor formed in a Chip Scale Package (CSP) is employed as the sensor 5. The sensor 5 generates an electric signal according to light incident to the light receiving area 5a via the lens unit 2 and outputs the signal therefrom.

The glass cover 7 is arranged between the filter 4 and the sensor 5. The sensor 5 is attached onto the glass cover 7. In more detail, on a light emitting surface (a bottom surface) of the glass cover 7, there is beforehand formed a wiring pattern excepting an area corresponding to the light receiving area 5a of the sensor 5. A plurality of solder bumps 8 are arranged to connect electrodes of the wiring pattern to the sensor 5. The solder bumps 8 arranged at the electrode positions fix the sensor 5 onto the glass cover 7 and establishes electric connection between the sensor 5 and the electrodes of the glass cover 7.

In the configuration, the distance between the sensor 5 and the glass cover 7 is determined by the size of the solder bumps 8. Since the size of the solder bumps 8 can be easily controlled, it is possible to appropriately adjust the distance between the sensor 5 and the glass cover 7. Since a plurality of solder bumps 8 are used for the purpose, there is obtained a mean value of distance therebetween.

On the light emitting surface of the glass cover 7, solder bumps 9 are disposed at positions other than those of the electrodes. The solder bumps 9 secure electric connection between the glass cover 7 and the flexible printed circuit 6. The solder bumps 9 also serve as spacers to keep distance between the sensor 5 fixed onto the glass cover 7 and the printed circuit 6.

A reinforcing plate 10 having a light interrupting function is fixed onto the rear surface of the flexible printed circuit 6 at a position thereof corresponding to the pedestal 3 by use of adhesive 11. The reinforcing plate 10 enhances strength of the printed circuit 6 having flexibility and is a light-interrupting member having a contour of a plate. The plate 10 has an external size substantially equal to that of the bottom surface of the pedestal 3.

Figure 4:
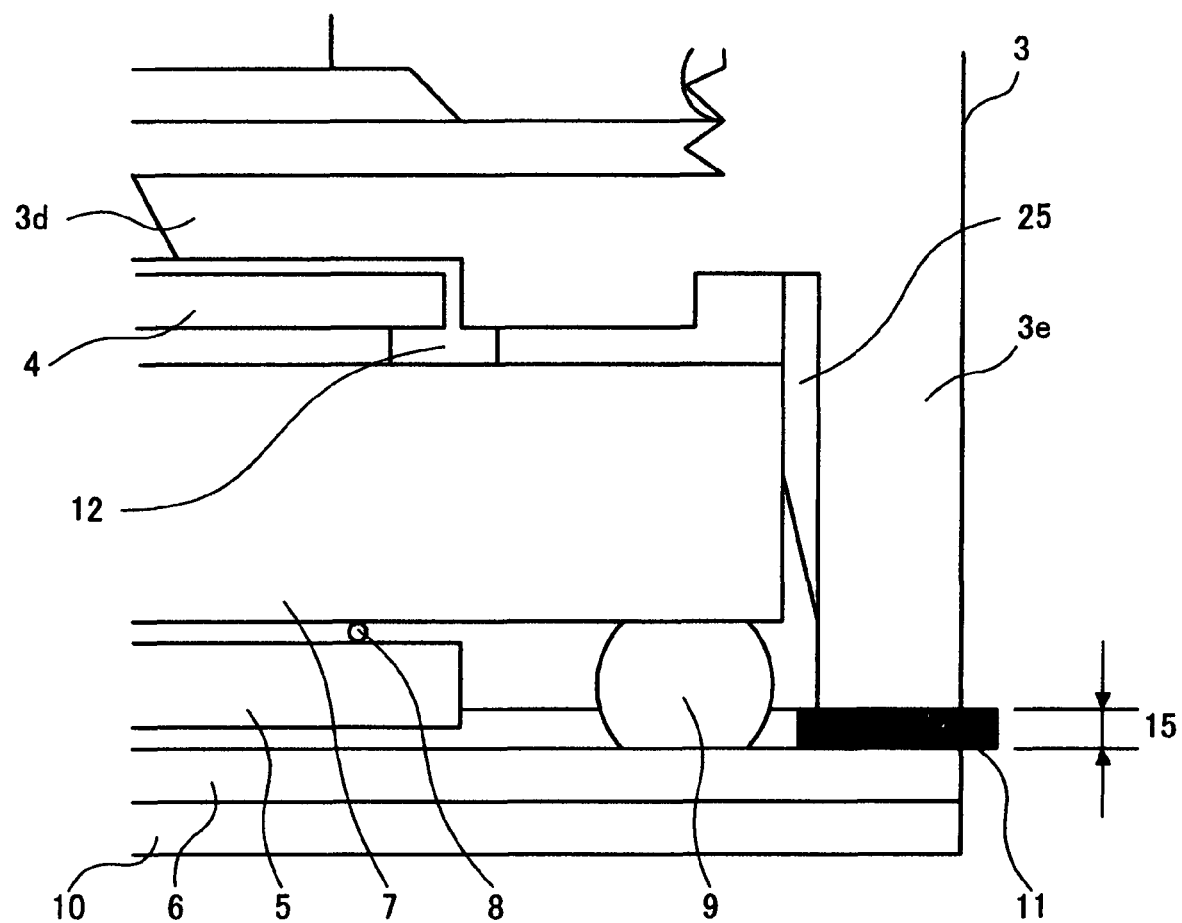
FIG. 4 is a magnified cross-sectional view of section P of FIG. 3.

FIG. 4 shows a magnified view of section P of FIG. 3.

In the camera module 1, the pedestal 3 is fixed onto the flexible printed circuit 6 using the adhesive 11. A plurality of bosses 12 having a cylindrical contour are formed on a mounting surface of the glass cover 7. The bosses 12 are brought into contact with the glass cover 7 to appropriately align the glass cover 7 with the pedestal 3. That is, the bosses 12 are pushed against the glass cover 7 and then the sidewall section 3e of the pedestal 3 is fixed onto the printed circuit 6 by use of the adhesive 11 to appropriately align the glass cover 7 with the pedestal 3 in the direction of height of the camera module 1. In this state, a gap 15 exists between the bottom end surface of the sidewall section 3e and the printed circuit 6, the gap 15 being filled with the adhesive 11. As a result, the glass cover 7 onto which the sensor 5 is attached is covered with the sidewall section 3e of the pedestal 3 and the flexible printed circuit 6. The adhesive 11 is, for example, an adhesive having a ultraviolet-ray setting or thermosetting characteristic and preferably has a light interrupting function.

Figure 5:
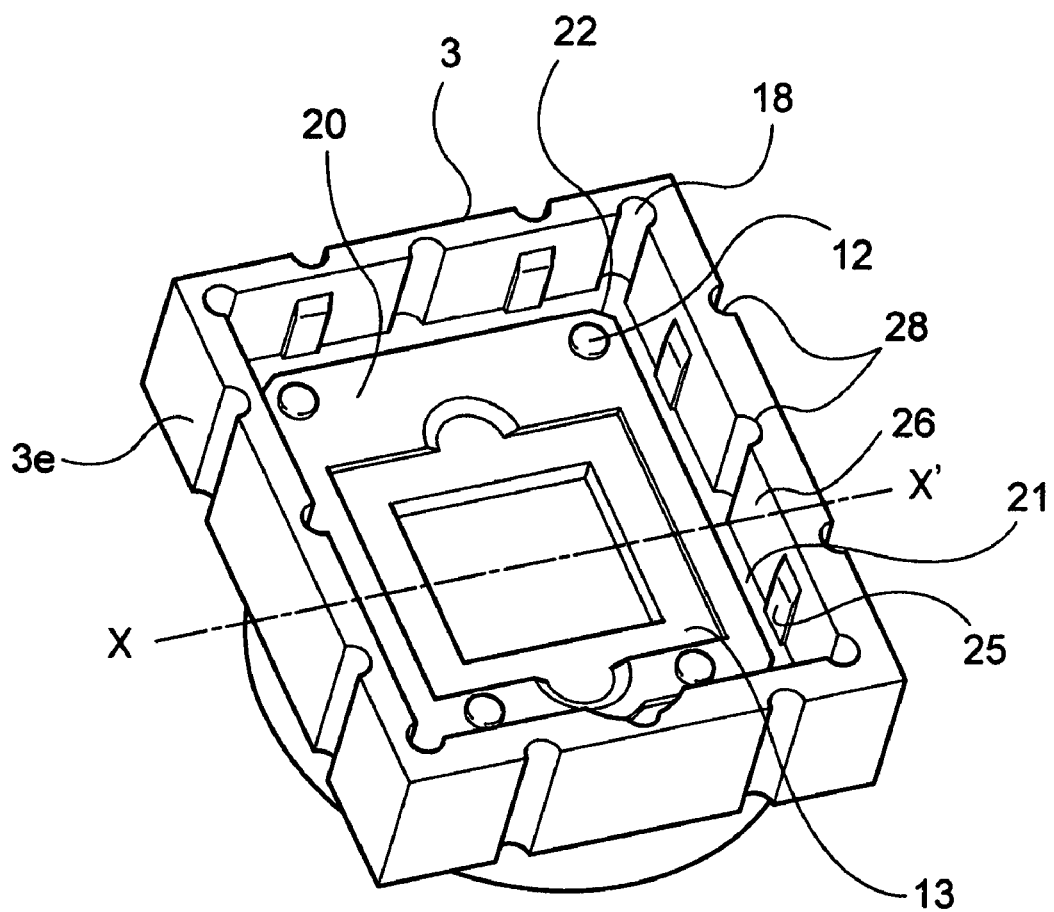
FIG. 5 is a perspective view of the camera module shown in FIG. 1 viewed from a bottom side thereof.

The boss 12 is disposed on four edges of the bottom surface 20 (the mounting surface of the glass cover 7; reference is to be made to FIG. 5). In the embodiment, four bosses 12 are formed in the pedestal 3 in a unit. It is not necessarily required to dispose four bosses 12. However, three or more bosses 12 are desirably disposed so that the glass cover 7 is stably installed to be perpendicular to an optical axis of the lens. The relative distance from the mounting surface of the filter 4 to an upper surface of each boss 12 is determined in consideration of thickness of the filter 4 and thickness of adhesive used to fix the filter 4 onto the mounting surface thereof. Based on the relative distance, height of the boss 12 is determined.

FIG. 5 is a perspective view of the pedestal 3 viewed from the bottom side. The cross-sectional view along line X-X' of FIG. 5 corresponds to the cross-sectional view shown in FIG. 3.

As can be seen from FIG. 5, on the bottom surface of the pedestal 3, there exist the mounting surface 13 of the filter 4 and the mounting surface 20 of the glass cover 7 including the bosses 12. The mounting surface 13 of the filter 4 is disposed in the inner side of the bosses 12 with a step therebetween. That is, the mounting surface 13 exists in a depression and is nearer to the light incident side than the bosses 12. The mounting surface 13 hence has a function to restrict the position of the filter 4. In the pedestal 3, there are formed holes, not shown, to remove gas generated by the adhesive 11.

On the mounting surface 20 of the glass cover 7 including the bosses 12 on the bottom surface of the pedestal 3, a groove 21 is formed along the sidewall section 3e. The groove 1 absorbs an excessive portion of the adhesive 11, the excessive portion being on the glass cover 7. The groove 21 is apart from the bosses 12.

On an inner surface of the sidewall section 3e, projections 25 are formed. The projections 25 are brought into contact with a side end surface (side surface) of the glass cover 7 to thereby determine the position of the glass cover 7 in the longitudinal and vertical directions. In the embodiment, two projections 25 are disposed for each inner surface of the sidewall section 3e. Areas other than the projections 25 are depressed relative to the projections 25 to form depressions 26. It is not necessarily required that two projections 25 are disposed for each inner surface. However, to align the glass cover 7 in a stable state in the longitudinal and vertical directions, at least three projections 25 are favorably disposed with a corner of the sidewall section 3e between two projections thereof. In other words, it is favorable that at least two projections 25 are disposed respectively in two mutually opposing inner surfaces of the sidewall section 3e and at least one projection 25 is disposed to an adjacent inner surface thereof. By securing the positional precision between the projections 25 and the side surfaces of the glass cover 7, the sensor 5 can be securely attached onto the glass cover 7 with higher positional precision (with respect to the optical axis) in the longitudinal and vertical directions.

Description will now be given of a method of producing the camera module according to the embodiment.

The glass cover 7 on which the sensor 5 is beforehand mounted is attached using the solder bumps 9 onto the flexible printed circuit 6 with the reinforcing plate 10 fixed on the bottom surface thereof. The lens unit 2 is installed in the pedestal 3 and then the filter 4 is fixed onto the pedestal 3 using adhesive. The lower end surface (fixing surface) of the sidewall section 3e of the pedestal 3 is coated with the adhesive 11 to fixedly attach the flexible printed circuit 6 onto the pedestal 3. In this process, the projections 25 formed in the sidewall section 3e are brought into contact with the side end surfaces of the glass cover 7 for the alignment described as above.

Subsequently, the focusing adjustment is carried out by the lens unit 2 screwed in the cylindrical section 3a and then the lens unit 2 is fixed onto the pedestal 3 using the adhesive 11. This adjusts the positional alignment (focusing alignment) of the lens unit 2 in the focusing direction.

As above, after the lower end surface of the sidewall section 3e of the pedestal 3 is coated with the adhesive 11, the flexible printed circuit 6 is fixed onto the pedestal 3. Resultantly, in the operation in which the glass cover 7 attached with the printed circuit 6 is installed on the inner side of the sidewall section 3e to fix the lower end surface thereof onto the printed circuit 6, there exists a fear that an excessive portion of the adhesive 11 flows over the glass cover 7 to enter the inside of the pedestal 3. If the adhesive 11 interrupts the light from the unit 2 to the imaging area 5a, the imaging or picture quality is affected. It is hence required to pay attention to this phenomenon. However, the projections 25 are arranged in the inner surfaces of the sidewall section 3e, and hence the sidewall section 3e outwardly shifts relative to the glass cover 7. This reduces the amount of the adhesive 11 on the glass cover 7 as compared with the case in which the projections 25 are not employed.

Figure 6:
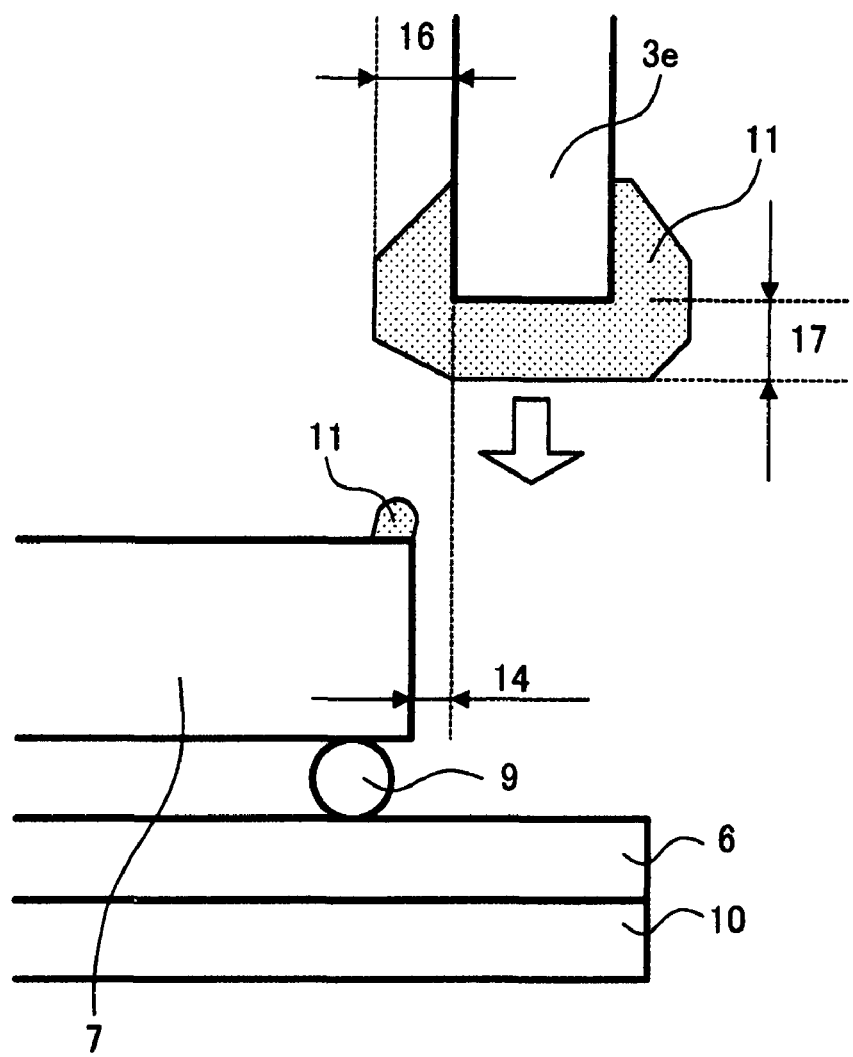
FIG. 6 is a cross-sectional view showing a state of coating of adhesive at a corner of a side wall section in the camera module shown in FIG. 1.

To coat the lower end surface (fixing surface) of the sidewall section 3e with the adhesive 11, the sidewall section 3e of the pedestal 3 is soaked into a layer of the adhesive 11 with a thickness adjusted to predetermined value. FIG. 6 shows a cross-sectional view of a state in which the sidewall section 3e is coated with the adhesive 11. However, as can be seen from FIG. 6, when this method is employed, not only the lower end surface (indicated by a reference numeral 17 in FIG. 6) of the sidewall section 3e is coated with the adhesive 1. That is, the side surface (indicated by a reference numeral 16 in FIG. 6) is also coated with the adhesive 11.

The inventors have measured the state of adhesive using a trial model. The adhesive is adjusted to have a thickness of about 0.3 millimeters (mm). As a result of measurement, the thickness on the lower end surface 17 of the sidewall section 3e takes a maximum value of about 0.3 mm and that on the side surface 16 takes a maximum value of about 0.24 mm.

The adhesive thickness on the side surface 16 is more than the length of a gap 14 between the sidewall section 3e and the side end surface of the glass cover 7. Therefore, an excessive portion of the adhesive 11 flows onto the glass cover 7 when the pedestal 3 is mounted on the glass cover 7.

Returning to FIG. 5, the distance between the projections 25 of the sidewall section 3e and the glass cover 7 is set according to the maximum value of the dimension tolerance. That is, the projections 25 are projected to the maximum extent and hence the inner space is reduced as much as possible. Additionally, the space prepared in the sidewall 3e is set to just accommodate the glass cover 7 even if the glass cover 7 is produced in its maximum allowable size.

Each projection 25 rises beginning at an inner bottom of the pedestal 3 (the mounting surface of the glass cover 7), more correctly, at a bottom surface of the groove 21, which will be described later, and is in contact with the glass cover 7 up to half the thickness of the glass cover 7. The projection 21 is tapered in its upper section. As a result, it is possible to reduce the amount of the adhesive 11 which flows onto the glass cover 7 due to an excessive portion of the adhesive 11.

Moreover, to absorb the adhesive 11 on the glass cover 7, the embodiment includes the groove 21 along the sidewall section 3e of the pedestal 3. The groove 21 is apart from the bosses 12. Since the projections 25 are arranged in the sidewall section 3e, it is possible to further expand the width of the groove 21 in the pedestal 3.

Figure 7A:
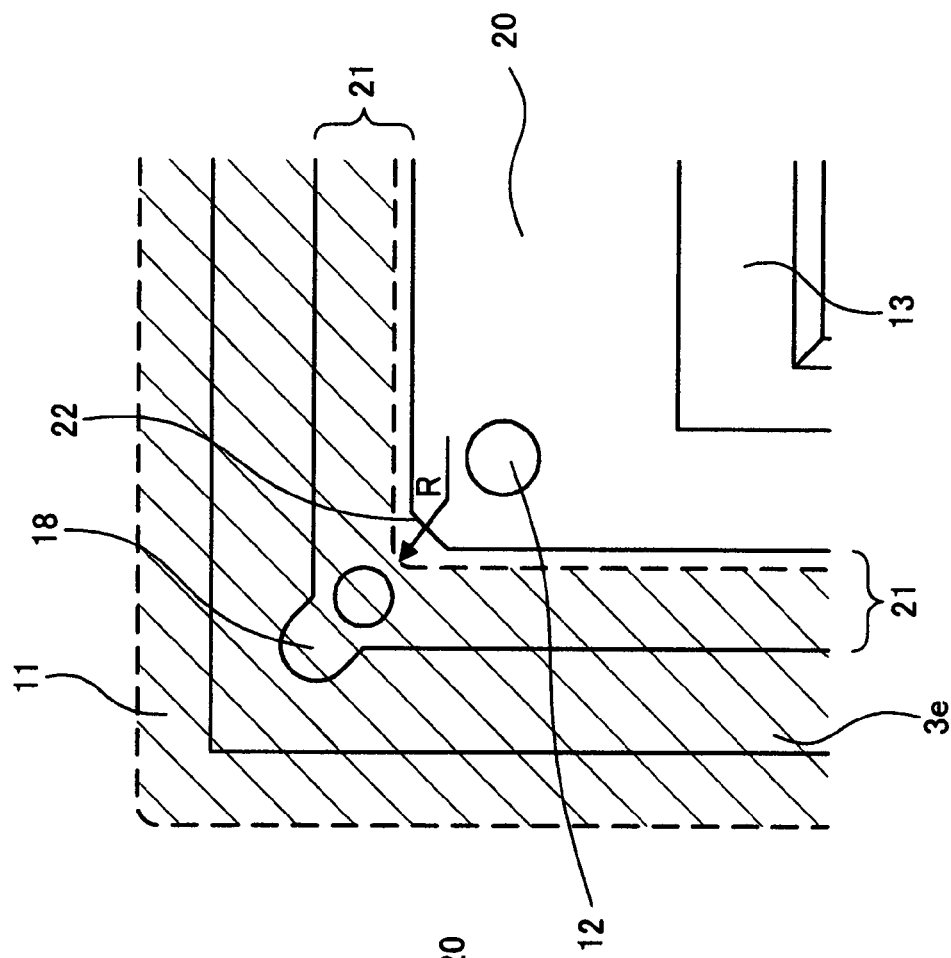
FIGS. 7A and 7B are diagrams showing states of coating of adhesive at a corner of a side wall section in the camera module of FIG. 1.
Figure 7B:
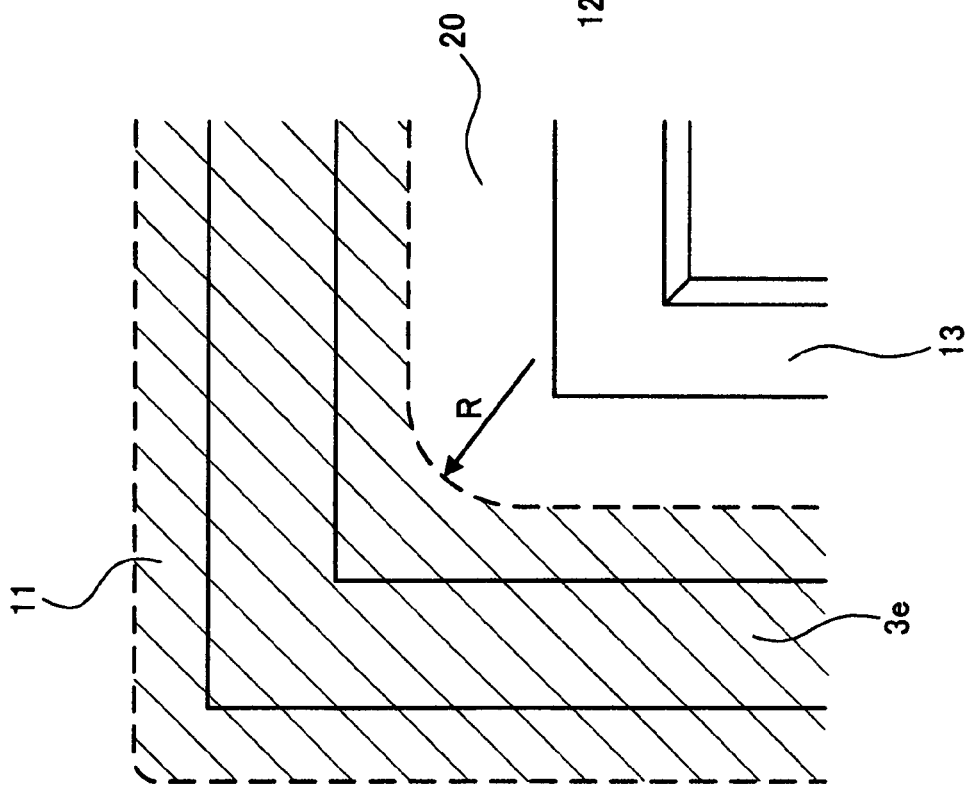

FIGS. 7A and 7B show states of the adhesive 11 in a corner when the lower end surface of the sidewall section 3e is coated with the adhesive 11. FIG. 7A shows a state of the adhesive 11 at a corner in an example under consideration. FIG. 7B shows a state of the adhesive 11 at a corner when a notch 18 is disposed in the corner. In FIGS. 7A and 7B, the adhesive 11 on the glass cover 7 is hatched. As FIG. 7A shows, in the corner of the sidewall section 3e of the pedestal 3, the width of the adhesive 11, i.e., the radius of round chamfer of the adhesive 11 becomes larger due to surface tension. Although the adhesive 11 ideally has a right angle at the corner in the state, the region R has a radius of about 0.5 mm in the camera module 1 according to the measurement. To overcome the difficulty, a notch 18 is disposed in the corner of the sidewall section 3e (reference is to be made to FIG. 7B). The notch 13 is a depression in an inner surface at the corner of the sidewall section 3e to lower the area on the lower end surface of the sidewall section 3e. In the camera module 1, by using the notch 18 having a notch width of about 0.3 mm, the radius of the region R of the adhesive 11 can be lowered to about 0.1 mm. The contour of the notch 18 may be a triangle, a rectangle, or a circle.

Furthermore, to appropriately handle the adhesive 11 at the corner of the sidewall section 3e, a corner area (surface C) 22 is arranged in the depression or groove 21 of the pedestal 3. As a result, the groove 21 in the area 22 is larger in width than the other portions of the groove 21. It is hence possible to absorb the adhesive 11 flowing in the inside due to surface tension. Although the value of C is 0.2 mm in the corner area 22 of the camera module 1, the contour of the corner area 22 may be a curved area or a rectangular area.

Returning to FIG. 5, to overcome the difficulty associated with the adhesive 11 when fixing the pedestal 3 onto the flexible printed circuit 6, there are disposed notches 28 in the sidewall section 3e of the pedestal 3. The region with each notch 28 of the sidewall section 3e has a reduced thickness, i.e., the region is a thinner area. That is, a part of the lower end surface with the notch 28 of the sidewall section 3e has a reduced thickness. As a result, it is suppressed that the adhesive 11 flows into the inside as well as the outside of the pedestal 3. The notch 28 on the lower end surface of the sidewall section 3e may be disposed on the inner side or the outer side or may be disposed on both sides to be parallel to each other. Or, the notch 28 may be alternately disposed on the inner side and the outer side. The notch 28 may have a curved surface, a triangular surface, or a rectangular surface.

In the embodiment, there is disposed the middle ring 2e which serves as a diaphragm to limit the amount of light passing therethrough. In addition, to interrupt scattered light in an infrared wavelength zone, the filter 4 is disposed over the sensor 5. However, the present invention is not restricted by the embodiment. At the position of the middle ring 2e, a unit including the middle ring 2e and an infrared cut filter to interrupt light in an infrared wavelength zone may be arranged between the lenses 2b and 2b'. The unit may include different materials or may include one material. It is hence not required to fix the filter 4 onto the pedestal 3 and hence the production process is simplified and yield is improved. Since the fixing of the filter 4 onto the pedestal 3 is not required, the camera module 1 is further reduced in thickness.

According to the embodiment, the barrel 2a holding the lenses 2b and 2b' is screwed into the cylindrical section 3a of the pedestal 3 such that the pedestal 3 indirectly holds the lenses 2b and 2b'. However, the present invention is not restricted by the embodiment. Only if the focusing precision is secured, the pedestal 3 may directly hold the lenses 2b and 2b'. For example, if the depth of filed can be elongated by narrowing the diaphragm and/or by adopting a wide-angle lens, the focusing precision can be easily secured.

In the embodiment, the glass cover 7 is mounted on a plurality of bosses 12 formed on the pedestal 3. However, the present invention is not restricted by the embodiment. The glass cover 7 may be directly mounted on the pedestal 3 for the following reason. If the amount of the adhesive 11 on the glass cover 7 is small, the adhesive 11 completely enters the groove or depression 21.

The camera module 1 of the embodiment is associated with a camera module according to the present invention and the lens unit 2 of the embodiment is associated with a lens according to the present invention. The middle ring 2e and the pedestal 3 of the embodiment are associated respectively with a middle ring and a pedestal mount according to the present invention. The sidewall section 3e and the sensor 5 of the embodiment are associated respectively with a sidewall section and an imaging element according to the present invention. The flexible printed circuit 6 and the glass cover 7 of the embodiment are associated respectively with a printed circuit and a cover member according to the present invention. The adhesive 11, the notch 18, and the projection 25 of the embodiment are associated respectively with adhesive, a depression and discard module, and a projection and contact module according to the present invention. The groove 21, the corner area 22, and the notch 28 of the embodiment are associated respectively with a notch and discard module, a corner area and discard module, and a thinner area and discard module according to the present invention.

As above, the camera module 1 according to the embodiment includes a sensor 5 for converting light incident thereto into an electric signal and outputting the signal therefrom, a glass cover 7 for transmitting light, i.e., incident light to the sensor 5, a flexible printed board 6 for holding the sensor 5 and the glass cover 7 and for receiving an electric signal from the sensor 5, a lens unit 2 for focusing light incident thereto onto the sensor 5, and a pedestal 3 for holding the lens unit 2, the pedestal 3 including sidewall section 3e having a lower end surface being fixed onto the flexible printed board 6 using adhesive 11. The pedestal 3 including a sidewall section 3e including a discard module for discarding the adhesive 11. It is hence possible to reduce the amount of the adhesive 11 which flows onto the glass cover 7 due to an excessive portion of the adhesive 11 in the sidewall section 3e. It is prevented that the excessive portion of the adhesive 11 enters the imaging area. There can be provided a camera module in which at production of the camera module 1, it is prevented that the adhesive 11 flows into the imaging area due to the excessive portion of the adhesive 11. Therefore, the number of defectives is lowered in the production.

In the camera module 1 according to the embodiment, the pedestal 3 includes a groove or a depression 21 which is formed along the sidewall section 3e in a surface opposing the glass cover 7 and which includes a corner area 22 which includes a corner surface. In this region, the groove 21 is larger in width than the other regions of the groove 21. Therefore, the excessive portion of the adhesive 11 which flows from the lower end surface of the sidewall section 3e onto the cover glass 7 enters the groove 21 and hence does not enter the imaging area. This advantageously makes it possible to absorb the excessive portion of the adhesive 11 flowing into the inside due to surface tension.

In the camera module 1 according to the embodiment, in the corner area of the sidewall section 3e, a notch 18 is formed in an inner side of the corner to thereby reduce the area on the lower end surface 3 of the sidewall section 3e. Therefore, it is possible to reduce the amount of excessive portion of the adhesive 11 due to surface tension in the corner of the sidewall section 3e, and hence the amount of the adhesive 11 attached to the cover glass is reduced.

According to the camera module 1 of the embodiment, the thinner regions (notches) 28 are formed in the lower end section of the sidewall section 3e to be fixed onto the flexible printed circuit 6. It is hence possible to suppress that the excessive adhesive 11 enters the inside as well as the output side the pedestal 3.

In the embodiment, the projections 25 on the inner surface of the sidewall section 3e are in touch with the glass cover 7 at a plurality of points to determine the position of the glass cover 7. However, the present invention is not necessarily restricted by the embodiment. For example, the glass cover 7 may include projections to be in contact with the sidewall section 3e at a plurality of points for the following reason. The glass cover 7 is appropriately placed at a predetermined position through the contact at the plural points.

According to the embodiment, the barrel 2a holding the lenses 2b and 2b' is screwed into the cylindrical section 3a of the pedestal 3 such that the pedestal 3 indirectly holds the lenses 2b and 2b'. However, the present invention is not restricted by the embodiment. Only if the focusing precision is secured, the pedestal 3 may directly hold the lenses 2b and 2b'. For example, if the depth of field can be elongated by narrowing the diaphragm and/or by adopting a wide-angle lens, the focusing precision can be easily secured.

In the embodiment, the glass cover 7 is mounted on a plurality of bosses 12 formed on the pedestal 3. However, the present invention is not restricted by the embodiment. The glass cover 7 may be directly mounted on the pedestal 3 for the following reason. There exists no problem for the contact between the projections 25 and the glass cover 7. If the amount of the adhesive 11 on the glass cover 7 is large, the adhesive 11 flows into the groove 21.

As above, the camera module 1 according to the embodiment includes a sensor 5 for converting light incident thereto into an electric signal and outputting the signal therefrom, a glass cover 7 for transmitting light, i.e., incident light to the sensor 5, a flexible printed plate 6 for holding the sensor 5 and the glass cover 7 and for receiving an electric signal from the sensor 5, a lens unit 2 for focusing light incident thereto onto the sensor 5, and a pedestal 3 for holding the lens unit 2. The pedestal 3 including a sidewall section 3e which includes a lower end surface fixed onto the flexible printed plate 6. The surface of the pedestal 3 to be brought into contact with the glass cover 7 is apart from the sidewall section 3e. It is hence possible to secure precision of the surface to be brought into contact as above. For example, when the lower end surface of the sidewall section 3e is fixed onto the printed board 6 by use of the adhesive 11, the amount of the adhesive 11 fixed onto the glass cover 7 due to the excessive portion of the adhesive 11 can be reduced.

Also, the camera module 1 of the embodiment further includes the middle ring 2e which interrupts light in the infrared wavelength zone and which restricts the amount of light to transmit therethrough and the lenses 2b and 2b'. The middle ring 2e is held between the lenses 2b and 2b' of the lens unit 2. It is therefore not required to attach the filter 4, and hence the operation is simplified and yield is improved. Since the operation to attach the filter 4 is not required, the camera module 1 is further reduced in its thickness.

According to the camera module 1 of the embodiment, there are disposed the projections 25 which come into contact with the side end surface of the glass cover 7 to make the glass cover 7 apart from the inner surface. The glass cover 7 can hence be arranged apart from the inner surfaces of the sidewall section 3e. At the same time, it is possible to appropriately align the glass cover 7 in a direction perpendicular to the optical axis. It is resultantly possible to reduce the amount of the adhesive 11 fixed onto the glass cover 7 due to the excessive portion of the adhesive 11 which flows from the lower end surface of the sidewall section 3e. At production of the camera module 1, the process to attach the glass cover 7 onto the pedestal 3 is simplified. Also, after the glass cover 7 is attached, it is possible to reduce the chance in which unnecessary stress is applied onto the glass cover 7.

In the camera module 1 of the embodiment, the glass cover 7 is surrounded by the sidewall section 3e, and at least three projections are disposed with a corner of the sidewall section 3e between two projections thereof. Since at least three projections 25 formed as above are brought into contact with the side end surface of the glass cover 7 to determine the position of the glass cover 7, the sensor 5 attached to the glass cover 7 is aligned with high positional precision in the longitudinal and vertical directions.

Furthermore, according to the camera module 1 of the embodiment, the glass cover 7 is surrounded by the sidewall section 3e, and at least two projections 25 are disposed respectively in two mutually opposing inner surfaces of the sidewall section 3e and at least one projection 25 is disposed to an adjacent inner surface thereof. Since at least three projections 25 formed as above are brought into contact with the side end surface of the glass cover 7 to determine the position of the glass cover 7, the sensor 5 attached to the glass cover 7 is aligned with high positional precision in the longitudinal and vertical directions.

In the camera module 1 of the embodiment, the bosses 12 are disposed on the mounting surface 20 of the glass cover 7 to be brought into contact with the glass cover 7, the bosses being apart from the groove or depression 21. Therefore, the capacity of the groove 21 into which the excessive portion of the adhesive 11 flows is not restricted by the bosses 12.

Imaging Apparatus

Description will now be given of a cellular phone 100 as an example of an imaging apparatus including the camera module 1 of the embodiment. The camera module 1 of the embodiment is applicable to, in addition to the cellular phone 100, a camera mounted on a personal computer or a Personal Digital Assistant (PDA), a cameral mounted on a car, a monitor camera, and the like.

Figure 8:
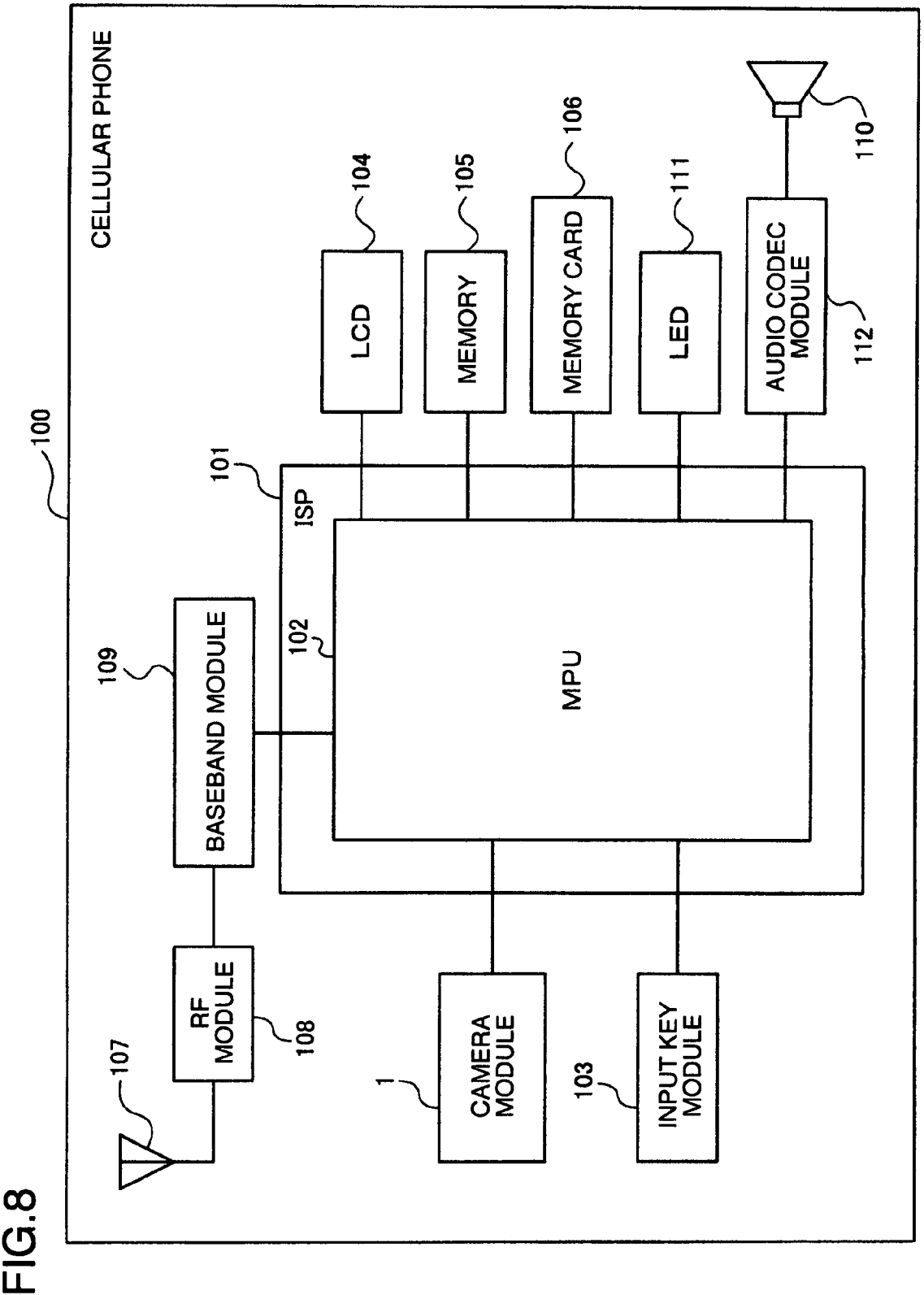
FIG. 8 is a block diagram showing a configuration of a cellular phone according to the embodiment.

FIG. 8 is a block diagram showing a configuration of the cellular phone 100. As FIG. 8 shows, the cellular phone 100 includes a image signal processor (ISP) 101 as an example of a signal processing module to execute image processing for an image signal from the camera module 1, a MicroProcessing Unit (MPU) 102 to conduct various control operations in the cellular phone 100, and an input key module 103 to supply instructions from the user to the MPU 102. The cellular phone 100 includes a Liquid Crystal Display (LCD) 104 to display an image of an object shot by the camera module 1. The cellular phone 100 also includes a memory 105 to store therein various information items to control the cellular phone 100 and a memory card 106 to record image data therein.

Additionally, the cellular phone 100 includes a Radio Frequency (RF) module 108 which receives via an antenna 107, for example, a radio wave in a cellular phone radio wave to conduct radio communication with a server managed by a cellular phone company or the like, a baseband module 109 to generate a signal for communication, an audio codec module 112 to reproduce voice and sound for a call as well as sound of, for example, a call reception notifying melody; a speaker 110 to produce voice and sound for a call reception on the basis of a signal from the audio codec module 112, and an LED 111 to notify a call reception by use of light.

For the communication of the camera module 1, the MPU 102 communicates signals via an interface, for example, IIC or SPI (Serial Peripheral Interface) with the camera module 1.

In the cellular phone 100, when a digital camera operation mode is selected by the input key module 103, the MPU 102 starts communication with the camera module 1. The MPU 102 transmits a control signal to the camera module 1. In response thereto, light which is emitted from an object and which is transmitted through the lens unit 2 of the camera module 1 is converted into an electric signal by the sensor 5 of the camera module 1 to be processed by the ISP 101. An image signal thus processed by the ISP 101 is temporarily saved in the memory 105 of the cellular phone 100 to be displayed as a through image on the LCD 104.

The shooting of an object is carried out by use of a shutter button disposed in the input key module 103. When the button is depressed, the MPU 102 saves image data processed by the ISP 101 in the memory 105. The MPU 102 includes a compression and decompression circuit operating based on schemes such as JPEG and MPEG. The image data saved in the memory 105 is compressed by the MPU 102 to be recorded in the memory card 106. It is also possible that the image data recorded in the memory card 106 is extracted or decompressed by the MPU 102 to be again displayed on the LCD 104.

In response to operation from the input key module 103, it is possible that the MPU 102 selects a shooting mode and sets various items such as white balance, exposure, and sensitivity. In the operation to save the image data processed by the ISP 101 in the memory 105, it is possible to execute digital zooming for the image data.

For example, the cellular phone 100 of the embodiment is associated with an imaging apparatus according to the present invention and the ISP 101 of the embodiment is associated with a signal processing module according to the present invention. The lens unit 2 and the pedestal 3 of the embodiment are associated respectively with a lens and a pedestal mount according to the present invention. The sidewall section 3e and the sensor 5 of the embodiment are associated respectively with a sidewall section and an imaging element according to the present invention. The flexible printed circuit 6 and the glass cover 7 of the embodiment are associated respectively with a printed circuit and a cover member according to the present invention. The adhesive 11 and the camera module 1 of the embodiment are associated respectively with adhesive and a camera module according to the present invention.

As described above, the camera module 1 according to the embodiment includes a sensor 5 for converting light incident thereto into an electric signal and outputting the signal therefrom, a glass cover 7 for transmitting light, i.e., incident light to the sensor 5, a flexible printed plate 6 for holding the sensor 5 and the glass cover 7 and for receiving an electric signal from the sensor 5, a lens unit 2 for focusing light incident thereto onto the sensor 5, and a pedestal 3 for holding the lens unit 2, the pedestal 3 including a sidewall section 3e to be attached onto the flexible printed board 6. A depression or groove 21 is disposed along the sidewall section 3e. This facilitates the attaching operation. Also, after the glass cover 7 is attached, it is possible to reduce the chance in which unnecessary stress is applied onto the glass cover 7. For example, in the operation to attach the pedestal 3 onto the flexible printed circuit 6 using the adhesive 11, it is possible to reduce the amount of the adhesive 11 fixed onto the glass cover 7 due to the excessive portion of the adhesive 11 flowing from the lower end surface of the sidewall section 3e. It is hence possible to prevent the adhesive 11 to enter the imaging area. There is hence provided a cellular phone 100 in which it is possible to prevent that the adhesive 11 enters the imaging area due to the excessive portion of the adhesive 11 in the production of the camera module 1, to thereby lower the number of defectives in the production. The projections 25 disposed on the inner surface of the sidewall section 3e are brought into contact with the glass cover 7 to determine the position of the glass cover 7 in the longitudinal and vertical directions. It is therefore provided a cellular phone 100 including a camera module 1 having high positioning precision in the longitudinal and vertical directions.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A camera module, comprising:
a lens including an optical axis for focusing incident light;
an imaging element for converting incident light incident thereto by the lens into an electric signal and outputting the electric signal therefrom;
a rectangular cover member for transmitting incident light condensed by the lens therethrough to the imaging element at one side of the cover member, the cover member further holding the imaging element;
a printed circuit board for holding the cover member for receiving as an input thereto the electric signal outputted from the imaging element; and
a pedestal mount for holding the lens comprising an upper part forming an upper space and a lower part forming a lower space holding the cover member, the lower part comprising a sidewall section for surrounding a side edge surface of the cover member by forming a rectangular-shaped space and a bottom wall section having an opening to the upper space, wherein
the pedestal mount is disposed abutting the cover member at a bottom of the pedestal mount and fixed on the printed circuit board in the optical axis direction by adhering adhesive to a lower end surface of the side wall section, and the pedestal mount includes depression-shaped discard means corresponding to a shape of the cover member, in the bottom wall section facing the cover member, and for withdrawing adhesive adhered to the another surface of the cover member; and
at least three projections are formed on an inner surface of the sidewall section and configured to contact the side edge surface of the cover member at a plurality of positions other than a corner of the sidewall section thereby positioning the cover member.

2. A camera module according to claim 1, further comprising a curved surface in a corner area of the depression-shaped discard means corresponding to the shape of cover member, the corner area having a larger groove width than areas other than the corner area.

3. An imaging apparatus connected with the printed circuit board of camera module according to claim 2, further comprising a signal processing unit for processing the electrical signal outputted from the board.

4. A camera module according to claim 1, wherein the discard means further includes a thin area in which at least a portion of the lower end surface of the sidewall section has a smaller thickness.

5. An imaging apparatus connected with the printed circuit board of camera module according to claim 4, further comprising a signal processing unit for processing the electrical signal outputted from the board.

6. A camera module according to claim 1, wherein a notch is formed on an inner side of a corner area of the sidewall section of the pedestal mount, the notch reducing an area of the lower end surface of the sidewall section.

7. An imaging apparatus connected with the printed circuit board of camera module according to claim 6, further comprising a signal processing unit for processing the electrical signal outputted from the board.

8. A camera module according to claim 1, wherein bosses are formed in the pedestal mount at the bottom wall section, the bosses being brought into contact with the cover member.

9. An imaging apparatus connected with the printed circuit board of camera module according to claim 8, further comprising a signal processing unit for processing the electrical signal outputted from the board.

10. An imaging apparatus connected with the printed circuit board of camera module according to claim 1, further comprising a signal processing unit for processing the electrical signal outputted from the board.

11. A camera module according to claim 1, wherein the at least three projections are configured to sandwich a corner area of said sidewall section, the projection being brought into contact with the side edge surface of the cover member and thereby determining a position of the cover member.

* * * * *